Feb. 8, 1938.   L. BÉCHEREAU ET AL   2,107,974
SHOCK ABSORBER
Filed May 10, 1935   4 Sheets-Sheet 2
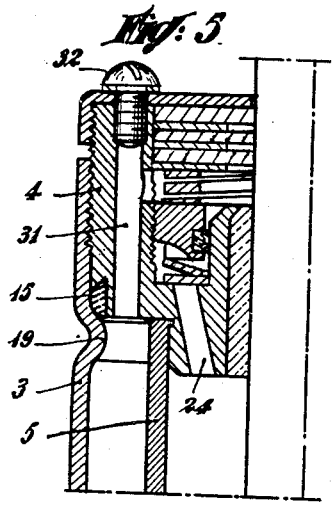
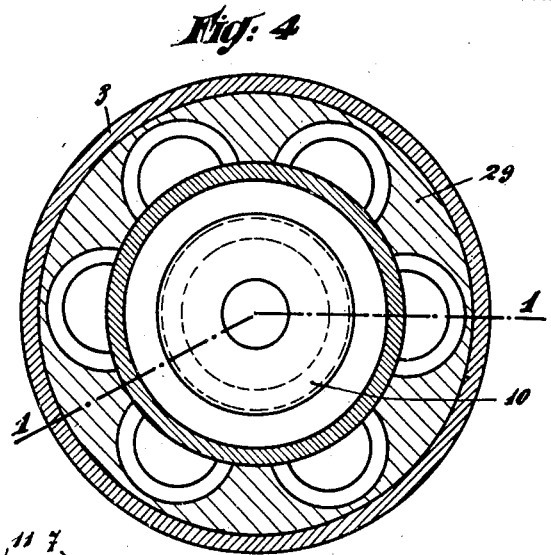
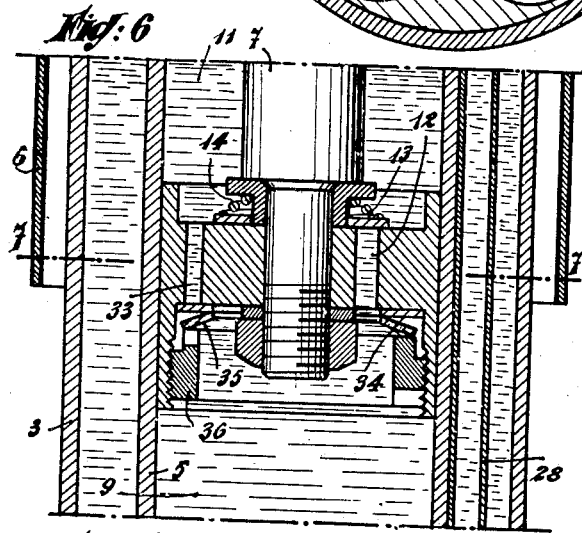
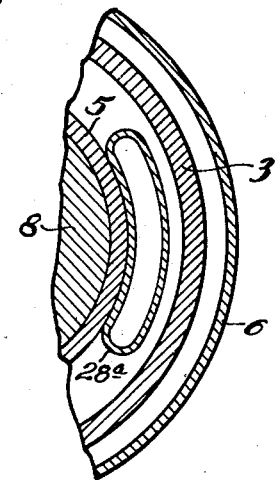
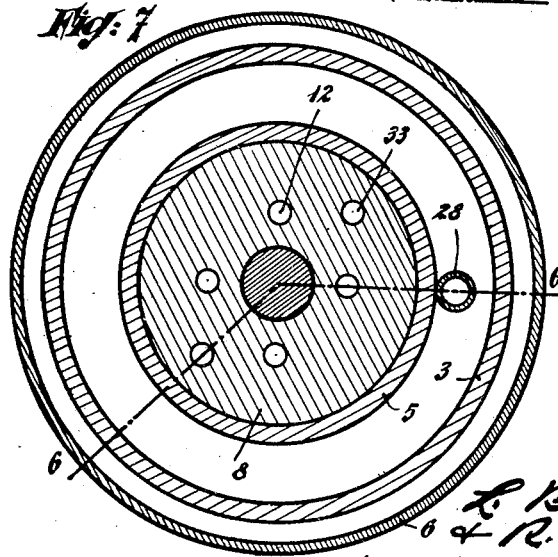

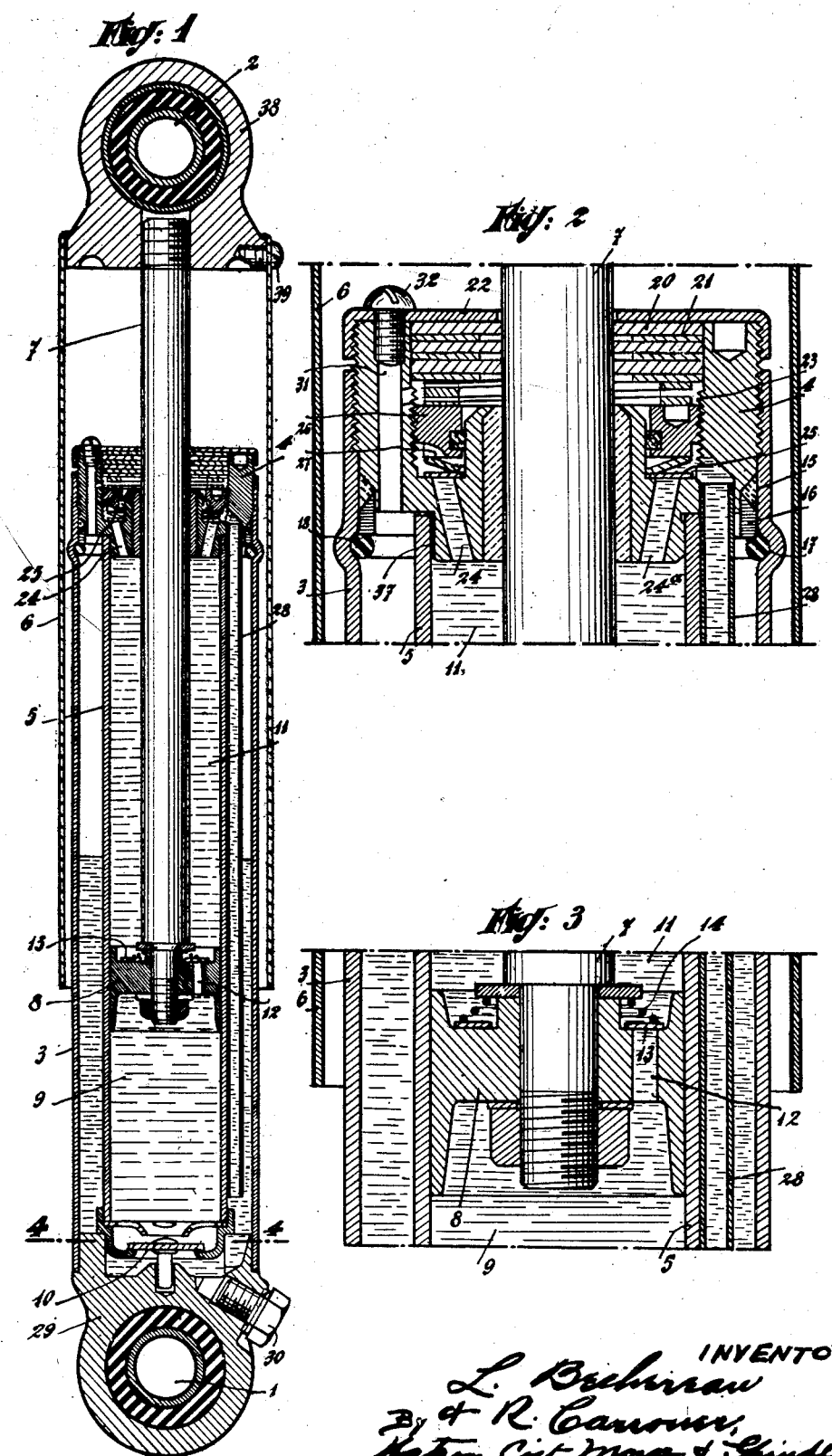

Feb. 8, 1938. L. BÉCHEREAU ET AL 2,107,974
SHOCK ABSORBER
Filed May 10, 1935 4 Sheets-Sheet 3
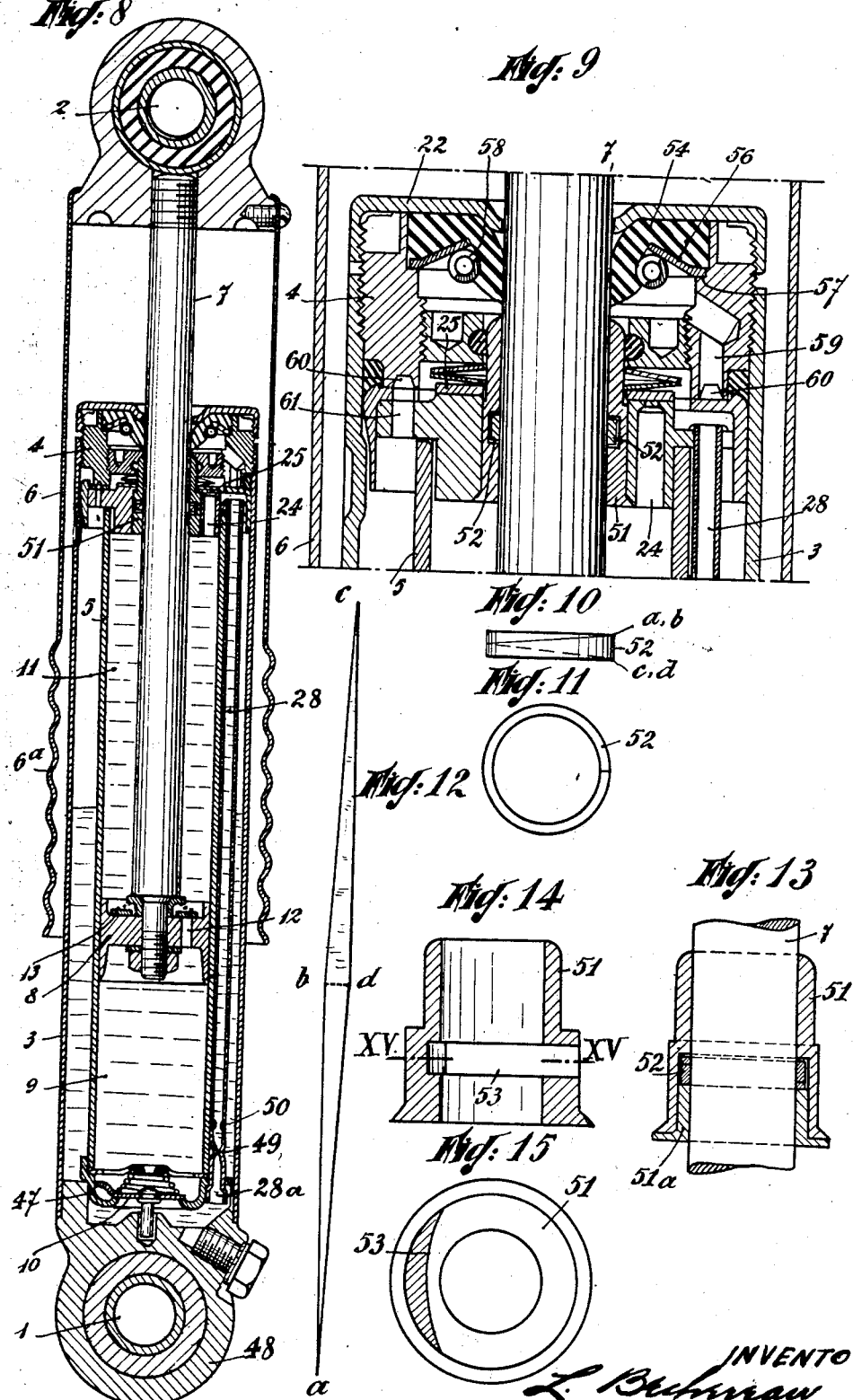

Patented Feb. 8, 1938

2,107,974

UNITED STATES PATENT OFFICE 2,107,974

SHOCK ABSORBER

Louis Béchereau and René Carroueé, Paris, France

Application May 10, 1935, Serial No. 20,857
In France November 29, 1934

9 Claims. (Cl. 188—88)

The present invention concerns a rectilinear hydraulic shock absorber of the double acting type, that is to say adapted to brake the relative displacements in both directions, as well during the compression as during the expansion of the springs with which it is associated.

The shock absorber according to the invention includes orifices which serve to brake the relative displacements in opposite directions. These orifices are located at the upper part of the cylinder, that is to say in a position where they can be reached without difficulty and the resistance opposed to the passage of the liquid can be adjusted from the outside of the cylinder after a minimum number of operations, by screwing or unscrewing a threaded plug, for instance.

The shock absorber according to the present invention consists of a double acting pump which works in a closed circuit and which discharges liquid from a reservoir, this liquid flowing, always in the same direction, through the orifice, or orifices, of the braking device, whatever be the direction of displacement of the piston. When the spring expands, the piston proper acts as a lift and force pump, while, when the springs are being compressed, the rod of this piston acts as a piston plunger.

As the absorption of the shocks is produced by the same means in both directions, the braking of the compression and the braking of the expansion both depend upon a single adjustment acting on said means.

Generally, the piston is provided only with the check valve for the flow of liquid which is necessary for the working of the pump, but said piston may also be provided with one or several orifices for exerting a supplementary braking action. In this case, the braking device provided at the upper end of the cylinder may be brought into action only for oscillations of large amplitude, small oscillations being simply braked, in the known manner, by the orifices provided in the piston.

In apparatus of the kind above referred to, and more generally in all telescopic hydraulic shock absorbers in which the oscillations are braked by the rectilinear movement of a piston in a cylinder filled with a liquid which is compelled to flow through small calibrated orifices, it is very important to avoid, as far as possible, leakage of the liquid into the cylinder head along the piston rod. Now stuffing boxes and similar devices used up to the present time do not comply with this requirement. In particular, with such devices, the bore through which the rod passes quickly becomes oval and permits liquid to leak past it.

According to the present invention, a scraping ring is inserted in the guiding piece of the piston rod and the film of liquid that may still remain along said rod is preferably subsequently wiped by a stuffing box at the end of the cylinder head.

This scraping ring, mounted in the guiding piece with an axial and radial play, is elastically pressed from all sides against the piston rod. Preferably it consists of a ring split helically over the whole of its circumference, so as to exert the same elastic pressure in all points of its surface of contact with the rod.

The provision of such a scraping ring is particularly advantageous with shock absorbers of the specific type above referred to, because, in these shock absorbers, the liquid moves in a closed circuit and the smallest air bubble penetrating into the cylinder may have a detrimental action upon the correct working of the apparatus. Furthermore, the scraping ring prevents liquid from being forced into the upper chamber of the cylinder head through the play resulting from the wear and tear of the guiding member and from consequently creating overpressures in this chamber, which would disturb the operation of the apparatus.

Other features of the present invention will result from the following detailed description of some specific embodiments thereof.

Preferred embodiments of the present invention will be hereinafter described with reference to the accompanying drawings, given merely by way of example, and in which:

Fig. 1 is a vertical axial section, on the line 1—1 of Fig. 4, of a shock absorbing device according to the invention;

Fig. 2 is a vertical sectional view, on an enlarged scale, of the braking device provided at the upper end of the cylinder;

Fig. 3 is a vertical sectional view, also on an enlarged scale, of the piston of the shock absorbing device;

Fig. 4 is a cross-sectional view, on the line 4—4 of Fig. 1, but on the same scale as Figs. 2 and 3, of the lower part of the cylinder;

Fig. 5 is a vertical sectional view of a modification of the packing means of the upper end of the cylinder;

Fig. 6 is a sectional view, analogous to Fig. 3, of a double acting piston, provided with a supplementary braking device;

Fig. 7 is a cross-sectional view on the line 7—7 of Fig. 6;

Fig. 7a is a part of a cross sectional view similar to that of Fig. 7, showing a modification;

Fig. 8 is a vertical axial section of a shock absorber provided with the scraping ring as above mentioned;

Fig. 9 is a vertical sectional view on an enlarged scale, of the cylinder head of the shock absorber, with its packing means;

Figs. 10 and 11 show the scraping ring separately, in elevational view and in plan view, respectively;

Fig. 12 shows the scraping ring open and developed;

Fig. 13 is an axial sectional view illustrating a first arrangement for mounting the scraping ring in the piston rod guiding sleeve;

Fig. 14 is a similar view of another arrangement for the same purpose;

Fig. 15 is a sectional view on the line 15—15 of Fig. 14.

Figure 16:
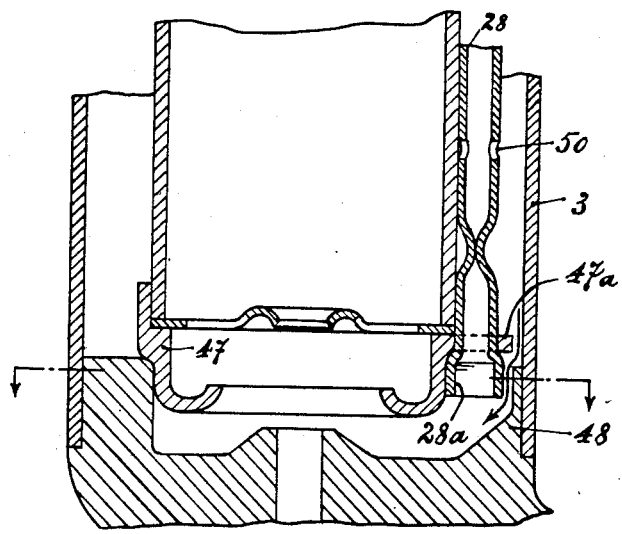
Fig. 16 is a detail view on an enlarged scale corresponding to the lower part of the casing of Fig. 8.
Figure 17:
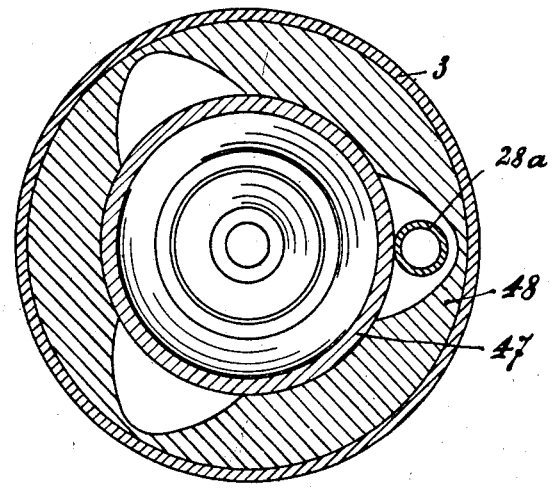
Fig. 17 is a sectional view on the line 17—17 of Fig. 16.

The shock absorber shown in Fig. 1 includes, in a known manner, two parts, movable, with a translatory movement, with respect to each other, to wit: a lower part assembled through a pivoting connection 1 with one of the two elements of the system of suspension, for instance to the unsuspended part of a vehicle, and an upper part connected, through articulation 2, with the other element of the system of suspension, for instance the suspended part of the vehicle in question.

The lower part of the shock absorber essentially comprises a cylindrical reservoir 3 closed at its upper part by a cap 4 and containing a cylinder 5 which is rigidly connected with reservoir 3 in coaxial relation therewith. The upper part of the shock absorber includes a cylindrical envelope 6 which coaxially surrounds reservoir 3, with a certain clearance space between them, and a piston rod 7 which extends, in a fluid tight manner, through cap 4 and which carries, at its lower end, a piston 8 adapted to slide in cylinder 5. The envelope 6 is removable and is fixed to support 38 through a screw 39.

The lower chamber 9 of cylinder 5 communicates only with the annular space of reservoir 3 through a check valve 10 opening only in the upward direction. It communicates also with the upper chamber 11 of cylinder 5 through one or several conduits 12 provided in piston 8 and controlled by an annular check valve 13. A spring 14 tends to constantly apply this check valve 13 against its seat (Fig. 3).

Reservoir 3 and cylinder 5 are both closed at their upper end by plug 4 which is screwed in cylinder 3 with a suitable packing device interposed therebetween. In Fig. 2, this device consists of a metallo-plastic joint 15 which is crushed between plug 4 and a ring 16 maintained in position in reservoir 3 by an elastic ring 17 which engages into an annular groove 18 of this reservoir.

In the modification shown in Fig. 5, reservoir 3 is provided with an inwardly projecting annular part 19, so that ring 16 is unnecessary, joint 15 being, in this case, crushed directly between cap 4 and projection 19 of the reservoir.

Member 4 is given the shape of a cup the bottom of which is provided with a hole for piston rod 7. A stuffing box, consisting preferably of flat annular elements 20 of an elastic material such as india-rubber separated from one another by metallic annular elements 21 and compressed against the bottom 22 of member 4 by a spring 23, is adapted to prevent leakage of liquid along said piston rod 7.

In the joint for assembling plug 4 with cylinder 5, there are provided one or several discharge grooves 37 adapted to permit air to escape when the apparatus is started.

The adjustable braking device is wholly localized in plug 4. It comprises one or several conduits such as 24, 24a provided in the plug and controlled by an annular valve 25. A threaded ring 26, the upper face of which supports spring 23, is screwed in plug 4 and compresses above valve 25 a Belleville washer 27. Ring 26 and washer 27 constitute the device for adjusting the shock absorber.

The braking conduits connect the upper chamber 11 of cylinder 5 with the lower part of reservoir 3 through one or several vertical tubes 28 the function of which will be hereinafter explained. In the case of a single tube 28, the latter may be given an oval or elongated cross section as shown at 28a, in Fig. 7a, in order to increase the rate of flow therethrough while reducing the space occupied in the radial direction.

The bottom 29 of reservoir 3 is provided with a plug 30 for filling it or emptying it, and the upper plug 4 is provided with a conduit 31 normally closed by a screw 32 and which serves chiefly to evacuate air when the apparatus is filled with liquid.

In the modification shown in Figs. 6 and 7, piston 8 includes, besides the orifices 12 and check valve 13, one or several supplementary braking calibrated orifices 33 provided with an annular check valve 34 acting in a direction opposite to the direction of action of check valve 13 and accordingly disposed on the lower face of the piston. This valve 34 is devised in the same manner as the chief braking check valve 25, that is to say it is maintained by a Belleville washer 35 adjustable through a threaded ring 36. In order to permit check valves 13 and 34 to work independently, passages 12 and braking conduits 33 are disposed around the axis of the piston on concentric circles of different diameters respectively (Fig. 7).

When chambers 9 and 11 are wholly filled with liquid and annular reservoir 3 is partly filled, up to a certain level (any level whatever), the operation of the shock absorber above described takes place as follows:

*First period.*—Reduction of length of the apparatus (compression of the springs).

The check valve 10 closes the lower passage between chamber 9 and reservoir 3. A portion of the liquid of chamber 9 passes into the upper chamber 11 through the conduits 12 of the piston, lifting check valve 13 from its seat. Due to the displacement of the piston 8, the volume in cylinder 5 available for the liquid decreases by an amount equal to the volume of the portion of rod 7 that has entered into the cylinder. A pressure is therefore established therein which depends upon the section of this rod. It opposes the downward movement of this rod and rises until it is sufficient for lifting valve 25 from its seat. The liquid the flow of which is thus braked passes into reservoir 3 through tube 28.

*Second period.*—Increase of length of the apparatus (expansion of the springs).

While the chamber 9 of the cylinder 5 is being filled with liquid entering through the bottom (valve 10 open), the upper chamber 11 empties through the braking conduits. Owing to the presence of the braking check valve, there is exerted on the upper face of the piston substantially the same pressure as in the first period, above described.

Since the pressures are substantially the same for both periods, the braking efforts in the two respective periods of operation of the shock absorber (compression and expansion) are in a ratio equal to the ratio of the cross section of the piston rod 7 and of the annular surface of piston 8. This ratio has therefore a constant value for a given shock absorber, and it is practically independent of the braking pressure, that is to say of the adjustment of valve 25. Consequently, it is sufficient to act on said valve 25 for adjusting both the braking during the compression stroke and the braking during the expansion stroke.

During both of these strokes, the liquid discharged through the braking orifices 24—24a is fed back to the lower part of reservoir 3 through one or several tubes 28 (a single tube 28 is shown in the drawings). The function of tube 28 is to prevent the liquid escaping from valve 25 from forming an emulsion with the air that is present in the upper part of reservoir 3 before it flows, under the action of gravity, down to the lower part of the apparatus. The adjunction of tube 28 eliminates any trace of air in the closed circuit through which the liquid flows.

In supplement to this function, tube 28 prevents beating of check valve 25 and renders the flow of liquid more regular since it avoids any sudden variation of the hydraulic pressure at the outlet of the valve.

When there is provided in the piston an auxiliary braking device (embodiment of Figs. 6 and 7), the small oscillations of the apparatus are braked by means of check valve 34, when the spring expands, the braking check valve 25 being brought into play only when the amplitude of the oscillations becomes relatively considerable so that the section of flow through orifices 33 is no longer sufficient for permitting the liquid displaced between chambers 9 and 11 to pass therethrough.

In order to fill the apparatus with liquid it suffices to remove screw 39 and cap 6 and to unscrew the whole of plug 4. If it is desired to avoid these operations when the apparatus is in service, it is also possible to inject the liquid by means of a syringe through the orifice of plug 30 after having removed said plug and also screw 32.

The shock absorber above described can be adjusted in the following manner:

After having unscrewed screw 39 and removed the protective cap 6, screw 32 is removed, the lid 22 of plug 4 is unscrewed and the stuffing box rings 20 and 21 are removed. Spring 23 is removed. It suffices to screw or unscrew threaded ring 26 for adjusting at will the pressure exerted by the Belleville washer 27 on valve 25.

In the embodiment of Fig. 8, in order to protect envelope 6 against deterioration and deformation which might result in its being brought into frictional contact with the outer surface of reservoir 3, the lower portion of this envelope is corrugated, as shown at 6a. Of course an envelope of this shape can be used in all embodiments of the invention.

In this embodiment of Fig. 8, this tube 28 is surrounded by a collar 47a integral with the seat 47 of check valve 10, and the portion of said tube 28 below collar 47a engages one of three radial notches formed in the wall of the bottom part 48 of reservoir 3 so as to give a circumferential fixedness to said tube 28 and said seat 47; on the other hand, a distortion of the seat 47 is prevented.

However, in order to prevent air bubbles that pass eventually through tube 28 from entering cylinder 5, said tube is throttled so as to be closed at 49, slightly above the level of seat 47 and the liquid from tube 28 passes into reservoir 3 through one or several orifices 50 (Fig. 8) provided in said tube 28 above the throttled part 49 thereof.

When passing through the head 4 of the cylinder, the rod 7 of the piston is guided by a sleeve 51 (Fig. 9). In an annular groove or recess provided in the inner face of this sleeve a packing ring 52 is inserted. This ring 52 is shown separately in Figs. 10 and 11. Said ring is applied by its own elasticity against rod 7. On the contrary, the packing ring is provided with a certain play in its housing with respect to sleeve 51, as well in the direction of the axis of the apparatus as in the transverse direction.

As shown in Fig. 12, in which the ring 52 is developed, said ring is obtained from a metal band having the shape of an elongated parallelogram $abcd$ the shorter diagonal $bd$ of which is at right angles to the parallel sides $ab$ and $cd$. This metal band $abcd$ is wound into a circular shape, the apex $a$ coming against the apex $b$, and the apex $c$ coming against the apex $d$ (Fig. 10).

It will be readily understood that the packing ring thus constituted is applied against rod 7 with an elastic force which is the same in all points, which is very important for ensuring liquid-tightness as perfect as possible.

In order to permit the insertion of ring 52 into its annular housing of sleeve 51, we may use, for instance, either of the arrangements shown in Figs. 13 to 15. In the case of Fig. 13, the sleeve is made of two parts 51 and 51a, the latter being introduced with a force fit into the main piece 51 after the packing ring 52 has been inserted in position.

In the other case (Figs. 14 and 15), sleeve 51 is made of a single piece, but it is thicker than in the first case and it is cut away at 53 so as to permit of inserting the packing ring laterally. The sleeve is then introduced with a force fit into the cylinder head in such manner that the recess 53 is closed in a liquid-tight manner.

Above sleeve 51, the cylinder head contains a packing device including a piece 54 of rubber or another plastic material which is kept applied against the lid 22 by a metallic ring 56 bearing against a shoulder 57 of head 4. This annular piece 54 is provided, on the outer side, with an annular groove in which is inserted a circular coil spring 58 which constantly applies the inner face of piece 54 against rod 7.

The liquid that has been scraped along the rod by piece 54 flows through vertical conduit 59, annular channel 60 and conduit 61 and is thus fed back to reservoir 3.

Therefore, for practical purposes, leakage of liquid is rendered impossible by the arrangement above described.

While we have, in the above description, disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What we claim is:

1. A shock absorber for use in connection with a suspension including two parts movable with respect to each other, which comprises, in combination, a cylinder filled with liquid, a reservoir containing liquid, rigid with said cylinder, means for mechanically connecting both said cylinder and said reservoir with one of the parts of the suspension, means for permitting said liquid to flow in a closed circuit through said reservoir and said cylinder, in series, only in the upward direction through the cylinder and in the downward direction through the reservoir, the upper end of said cylinder being provided with passages of restricted section of flow extending between said cylinder and said reservoir, for braking the flow of liquid therethrough, means in said cylinder operatively connected with the other part of said suspension for forcing liquid through these braking passages whatever be the direction of the relative displacements of said two parts of the suspension with respect to each other, and means for adjusting the flow through said passages.

2. A shock absorber for use in connection with a suspension including two parts movable with respect to each other, which comprises, in combination, a cylinder filled with liquid, a reservoir containing liquid, rigid with said cylinder, means for mechanically connecting both said cylinder and said reservoir with one of said parts of the suspension, a check valve opening in the upward direction interposed between the lower part of said cylinder and the lower part of said reservoir, a seat for said check valve carried by the lower part of said cylinder, the upper end of said cylinder being provided with passages of restricted section of flow extending between said cylinder and said reservoir, for braking the flow of the liquid from the upper part of the cylinder to the upper part of said reservoir, means for preventing liquid from flowing through said passages from the reservoir to the cylinder, a piston movable in said cylinder provided with a conduit extending therethrough, a check valve cooperating with said conduit opening in the upward direction, a piston rod rigid with said piston and extending through the upper end of said cylinder, means for operatively connecting said piston rod with the other part of the suspension, and means for adjusting the section of flow through said passages.

3. A shock absorber according to claim 2 in which said reservoir coaxially surrounds said cylinder, further including a tube connecting said braking passages at the upper end of the cylinder with the lower part of said reservoir.

4. A shock absorber according to claim 2 in which said piston is further provided with supplementary braking passages and a check valve adapted to cooperate with said passages opening in a downward direction adapted to work for displacements of small amplitude of the piston with respect to the cylinder.

5. A shock absorber according to claim 2 further including a sleeve, carried by the upper end of said cylinder so as to surround the piston rod, provided with a housing, an elastic scraping ring mounted in said housing and surrounding said piston rod so as to be evenly applied against it over its whole circumference, a packing member surrounding said rod and an annular coil spring for applying said packing member against said piston rod.

6. A shock absorber according to claim 2 in which said reservoir coaxially surrounds said cylinder, further including at least one tube communicating at the upper end thereof with said braking passages at the upper end of the cylinder, a collar rigid with said seat surrounding said tube at its lower end, said tube extending down to a level below said collar, the lower part of the wall of said reservoir being provided with a radial notch adapted to accommodate the portion of said tube located below said collar, so as to angularly fix said seat in position with respect to said reservoir, said tube being closed near its lower end by throttling above the level of said collar and being provided with at least one outlet orifice in its wall located immediately above said throttled portion, whereby the liquid flowing down through said tube issues therefrom at a level above that of said collar.

7. A shock absorber according to claim 2 further including an envelope rigid with said piston and surrounding both said cylinder and said reservoir, the lower portion of said envelope being corrugated so as to avoid deformation thereof.

8. A shock absorber for use in connection with a suspension including two parts movable with respect to each other, which comprises, in combination, a cylinder filled with a liquid operatively connected with one of the parts of the suspension, means, operatively connected with the other part of the suspension, movable in said cylinder, for braking the relative displacements of these two parts of the suspension with respect to each other, a rod connected with said means extending through one end of said cylinder parallel to the axis thereof, a guiding sleeve, carried by the upper end of said cylinder so as to surround said rod, provided with a housing, and an elastic scraping ring mounted in said housing and surrounding said rod, said sleeve being cut away transversely so as to permit of inserting said ring in said housing.

9. In a structure including a container filled with a liquid and a rod extending through the wall of said container, the combination of a guiding member for said rod carried by said wall, said member being provided with an annular recess surrounding said rod, and a ring consisting of a parallellogram-shaped metal band wound in an elastic manner so as to form a split ring mounted in said recess with a certain play both in the longitudinal and transverse directions, tightly applied in an elastic manner around said rod, whereby said liquid is prevented from leaking out from said container in spite of wear and tear of said guiding member, the bore of which may become larger than the cross section of said rod, owing to the cooperation, with the transverse faces of said recess, of said ring.

LOUIS BÉCHEREAU.
RENÉ CARROUEÉ.